(12) United States Patent
Grant

(10) Patent No.: US 10,956,303 B2
(45) Date of Patent: Mar. 23, 2021

(54) TRACE DATA REPRESENTATION

(71) Applicant: ARM Limited, Cambridge (GB)

(72) Inventor: Alasdair Grant, Cambridge (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 15/915,473

(22) Filed: Mar. 8, 2018

(65) Prior Publication Data

US 2018/0276106 A1  Sep. 27, 2018

(30) Foreign Application Priority Data

Mar. 24, 2017 (GB) ..................................... 1704675

(51) Int. Cl.
*G06F 11/36* (2006.01)
*G06F 11/34* (2006.01)
*G06F 9/30* (2018.01)

(52) U.S. Cl.
CPC ...... *G06F 11/3636* (2013.01); *G06F 9/30058* (2013.01); *G06F 11/348* (2013.01); *G06F 11/3466* (2013.01); *G06F 11/3648* (2013.01); *G06F 2201/865* (2013.01); *G06F 2201/88* (2013.01)

(58) Field of Classification Search
None
See application file for complete search history.

(56) References Cited

U.S. PATENT DOCUMENTS

| 6,351,844 | B1 * | 2/2002 | Bala | G06F 9/30061 |
| | | | | 717/128 |
| 7,802,236 | B2 * | 9/2010 | Calder | G06F 11/3466 |
| | | | | 717/130 |
| 8,959,496 | B2 * | 2/2015 | Schulte | G06F 8/456 |
| | | | | 717/148 |
| 9,195,462 | B2 * | 11/2015 | Xu | G06F 9/3808 |
| 2007/0079293 | A1 * | 4/2007 | Wang | G06F 9/45516 |
| | | | | 717/128 |

(Continued)

FOREIGN PATENT DOCUMENTS

EP  0999498 A2 *  5/2000  ......... G06F 9/45504

OTHER PUBLICATIONS

Lhadj, "Techniques to Simplify the Analysis of Execution Traces for Program Comprehension", 2005, Ottawa-Carleton Institute for Computer Science School of Information Technology and Engineering (Year: 2005).*

(Continued)

*Primary Examiner* — Hossain M Morshed
(74) *Attorney, Agent, or Firm* — Nixon & Vanderhye, P.C.

(57) ABSTRACT

Trace circuitry 22, 6 forms trace objects 34 representing a sequence of executed program instructions and comprising a start address indicator indicating a start address of a sequence of executed program instructions, a branch outcome indicator indicating a sequence of branch outcomes within the sequence of executed program instructions starting from the start address and a count indicator indicating a count of times the sequence of branch outcomes was detected. The trace circuitry may be on-chip 22 or off-chip 6. A trace object may include an indicator of a start address of a next sequence of program instructions to be followed following the sequence of program instructions represented by the trace object concerned.

21 Claims, 4 Drawing Sheets

(56) References Cited

U.S. PATENT DOCUMENTS

2009/0287729 A1* 11/2009 Chen .................. G06F 11/3676
2013/0047169 A1*  2/2013 Gagliardi ............ G06F 11/3636
                                                          719/317
2017/0075685 A1*  3/2017 Grant ........................ G06F 8/70
2017/0277538 A1*  9/2017 Friedmann ............ G06F 9/3867

OTHER PUBLICATIONS

Kao, "Ottawa-Carleton Institute for Computer Science School of Information Technology and Engineering", 2007, IEEE Transactions on Circuits and Systems—I: Regular Papers, vol. 54, No. 3, Mar. 2007 (Year: 2007).*
Kao, "A Hardware Approach to Real-Time Program Trace Compression for Embedded Processors", 2007, IEEE (Year: 2007).*
Combined Search and Examination Report for GB1704675.6, dated Sep. 25, 2017, 6 pages.

* cited by examiner

TRACE DATA REPRESENTATION

This application claims priority to GB Patent Application No. 1704675.6 filed 24 Mar. 2017, the entire contents of which is hereby incorporated by reference.

BACKGROUND

Technical Field

This disclosure relates to the field of data processing systems. More particularly, this disclosure relates to the representation of trace data corresponding to sequences of executed program instructions within a data processing system.

Technical Background

It is known to provide data processing systems with trace mechanisms to enable the execution of sequences of program instructions to be analyzed by generating trace data indicative of the execution path through the program instructions followed by the data processing system. Such trace mechanisms are useful, for example, in debug and diagnostic operations performed on increasingly complex data processing systems and their associated programs.

A challenge arising in the provision of trace mechanisms is that they can produce large volumes of trace data that can be difficult to manage/handle. The amount of trace data may be reduced in a variety of different ways. In some forms of trace mechanisms the trace data merely gives that information required to follow the execution path through the program when the program itself is available, e.g. indications of executed or not executed outcomes for conditional branch instructions, data dependent changes of program flow and periodic synchronizing address data. Furthermore, the trace data may be subject to compression using a variety of compression techniques to reduce the data volume and ease the handling of the trace data. Such compression techniques may be improved in efficiency if the trace data is divided into streams representing different threads of execution (e.g. different threads executed by different processors within a multi-core processor) as there tends to be a higher degree of correlation within a thread enabling a higher degree of compression to be achieved compared with compressing trace data from different interleaved threads.

SUMMARY

At least some example embodiments of the present disclosure provide apparatus for processing data comprising:
processing circuitry to execute program instructions of a program; and
trace circuitry to generate a plurality of trace objects, wherein
a trace object represents a sequence of executed program instructions as:
  a start address indicator to indicate a start address of said sequence of executed program instructions;
  a branch outcome indicator to indicate a sequence of branch outcomes within said sequence of executed program instructions starting from said start address; and
  a count indicator to indicate a count of times said sequence of branch outcomes was detected.

At least some example embodiments of the present disclosure provide trace circuitry for coupling to processing circuitry executing program instructions of a program to generate a plurality of trace objects, wherein
a trace object represents a sequence of executed program instructions as:
  a start address indicator to indicate a start address of said sequence of executed program instructions;
  a branch outcome indicator to indicate a sequence of branch outcomes within said sequence of executed program instructions starting from said start address; and
  a count indicator to indicate a count of times said sequence of executed program instructions was executed.

At least some example embodiments of the present disclosure provide a method of processing data comprising:
executing program instructions of a program; and
generating a plurality of trace objects, wherein
a trace object represents a sequence of executed program instructions as:
  a start address indicator to indicate a start address of said sequence of executed program instructions;
  a branch outcome indicator to indicate a sequence of branch outcomes within said sequence of executed program instructions starting from said start address; and
  a count indicator to indicate a count of times said sequence of executed program instructions was executed.

At least some embodiments of the present disclosure provide a method of analyzing execution of a program comprising:
receiving data specifying program instructions of said program;
receiving data specifying trace objects representing a sequence of executed program instructions as:
  a start address indicator to indicate a start address of said sequence of executed program instructions;
  a branch outcome indicator to indicate a sequence of branch outcomes within said sequence of executed program instructions starting from said start address; and
  a count indicator to indicate a count of times said sequence of executed program instructions was executed; and
analyzing said data specifying program instructions and said data specifying trace objects to determine at least how many times a given program instruction was executed.

Further aspects, features and advantages of the present technique will be apparent from the following description of examples, which is to be read in conjunction with the accompanying drawings, in which:

DESCRIPTION OF EXAMPLES

Figure 1:
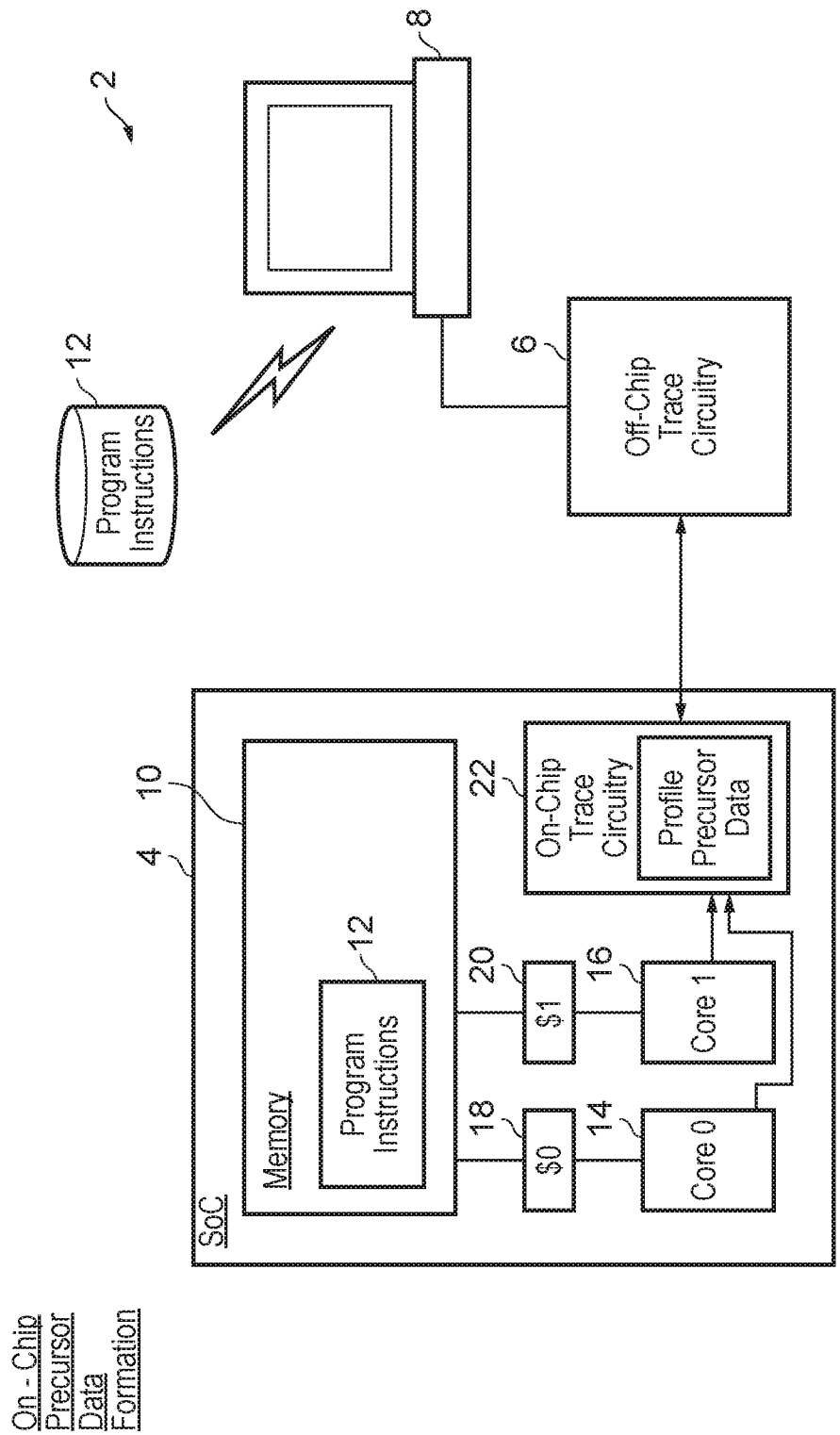
FIG. 1 schematically illustrates a data processing system using on-chip precursor data formation.

FIG. 1 schematically illustrates a data processing system 2 using on-chip precursor data formation. The data processing system 2 includes a system-on-chip integrated circuitry 4 connected via off-chip trace circuitry 6 to a general purpose programmable computer 8. The integrated circuit 4 includes a memory 10 storing program instructions 12 to be executed by processor cores 14, 16. Respective cache memories 18, 20 associated with the processor cores 14, 16 store program instructions 12 and data to be manipulated.

On-chip trace circuitry 22 is coupled to the processor cores 14, 16 and monitors their execution of program instructions. The processor cores 14, 16, which serve as processing circuitry to execute program instructions, provide the on-chip trace circuitry 22 with data indicative of branch instruction outcomes for conditional branch instructions executed by the core 14, 16 and program instruction addresses for non-static branch targets followed by the cores 14, 16. Furthermore, the processor cores 14, 16 may provide data indicative of program instruction addresses of program instructions executed by the cores 14, 16 as synchronization points, such as providing synchronization point addresses on a periodic basis. The on-chip trace circuitry 22 serves to buffer the data received from the cores 14, 16, and, in this example embodiment, use it to perform on-chip generation of profile precursor data comprising trace objects as will be discussed further below.

The on-chip trace circuitry 22 receives separate streams of execution characterizing data from the respective cores 14, 16 and these may be separately processed to form respective profile precursor data, i.e. one set of profile precursor data for core 14 and a set of profile precursor data for core 16.

The on-chip trace circuitry 22 processes the buffered data received from the cores 14, 16 to form trace objects. Each trace object represents a sequence of executed program instructions using a start address indicator to indicate a start address of that sequence of executed program instructions, a branch outcome indicator to indicate a sequence of branch outcomes within that sequence of executed program instruction starting from the start address and a count indicator to indicate a count of times the sequence of branch outcomes was detected within the window of execution of program instructions being monitored by the on-chip trace circuitry 22 and represented by the profile precursor data generated. The profile precursor data which is generated comprises a plurality of trace objects each representing a sequence of executed program instructions which were observed.

The trace objects of the profile precursor data may be considered in combination with the program instructions 12 in order that the particular program instructions executed within the sequence of executed program instructions may be identified. In other example embodiments when the trace objects include the next-address indicator, the profile precursor data alone can be used to give a use count of taken branch instructions their respective branch target addresses.

The profile precursor data comprising such trace objects permits a compact representation of the execution behaviour to be achieved but may not permit the precise end-to-end flow of execution through the entire window to be determined—rather it generates a more statistically based view of the execution whereby sequences of executed program instructions can be identified together with the number of times such sequences were detected.

In some example embodiments where the aim is to test code coverage, i.e. check which program instructions have or have not been executed within an entire program the count indicator may saturate at one thereby giving an indication of whether a particular code sequence has or has not executed at least once.

In at least some example embodiments, a trace object may also include a next address indicator to indicate a starting address of a next sequence of program instructions to be executed following the sequence of executed program instructions of the trace object including that next address indicator. Thus, a trace object may effectively include link information indicating a following trace object. This can enable recovery of at least some of the information regarding how trace object link together and give a more comprehensive view of the program execution flow.

The on-chip trace circuitry 22 when analyzing the buffered data received from the cores 14, 16 may serve to break this received data into sequences to be associated with trace objects by using received program instruction address data (e.g. data dependent branch target data, synchronization point data, etc.) to indicate the boundary between trace objects to be formed, thereby triggering the termination of tracking of a currently tracked sequence of program instructions and the starting of the tracking of a next track sequence of program instructions.

As previously mentioned the profile precursor data comprising the trace objects formed by the on-chip trace circuitry 22 in the example of FIG. 1 may be analyzed in combination with the program instructions 12 which were executed in order to understand the actual flow of program execution. This may be achieved by transferring the profile precursor data, which is now in a compact representation, to off-chip trace circuitry 6 from which it can be read by a general purpose computer 8. The general purpose computer 8 also may access a separate copy of the program instructions 12 executed by the integrated circuit 4 and in combination with the profile precursor data thereby identify the particular program instructions within the various sequences of program instructions corresponding to the trace objects identified in the profile precursor data.

The profile precursor data comprising the trace objects may have a variety of different forms. In some example forms the start addresses of trace objects forming the profile precursor data may be represented as address offsets from start addresses of other trace objects within the profile precursor data. Thus, relatively few absolute addresses need be specified within the profile precursor data and the addresses of other trace objects derived using offsets from these relatively few start addresses specified absolutely. This can make the profile precursor data more compact.

The form of the trace objects may in some embodiments be such as they each specify a single execution path. In other embodiments a trace object may specify a plurality of branching execution paths corresponding to respective sequences of branch outcomes starting from a common start address and passing through shared intermediate branching nodes until individually terminating at a respective leaf node. Such an arrangement may provide a more compact representation of the execution paths and so reduce the data volume of the profile precursor data. Within such embodiments, each leaf node may have an associated count indicator indicating a count of times the execution path terminating at that leaf node was executed as represented in the set of profile precursor data concerned. Within such an arrangement, a given intermediate node of a trace object may have the count of how many times a sequence of program instructions extending between the common start address and passing through that given intermediate node was executed represented by a sum of the count values associated with the leaf nodes of execution paths that include that given intermediate node. Thus, tracing forward from each intermediate node to the eventual leaf nodes enables a sum of the respective leaf node counts to be obtained thereby obtaining a count for the intermediate node concerned.

The leaf nodes may have an associated next address indicator indicating the address of a next program instruction executed by the processing circuitry following a branching execution path terminating at that leaf node. It may be that not all of the leaf nodes have such a next address value associated with them as this might not always be available. As previously discussed, the trace objects include a branch outcome indicating a sequence of branch outcomes within the sequence of executed program instructions starting from the start address for that trace object. The data volume of the profile precursor data may be reduced by using a branch outcome indicator which runlength encodes sequence of branch outcomes.

Figure 2:
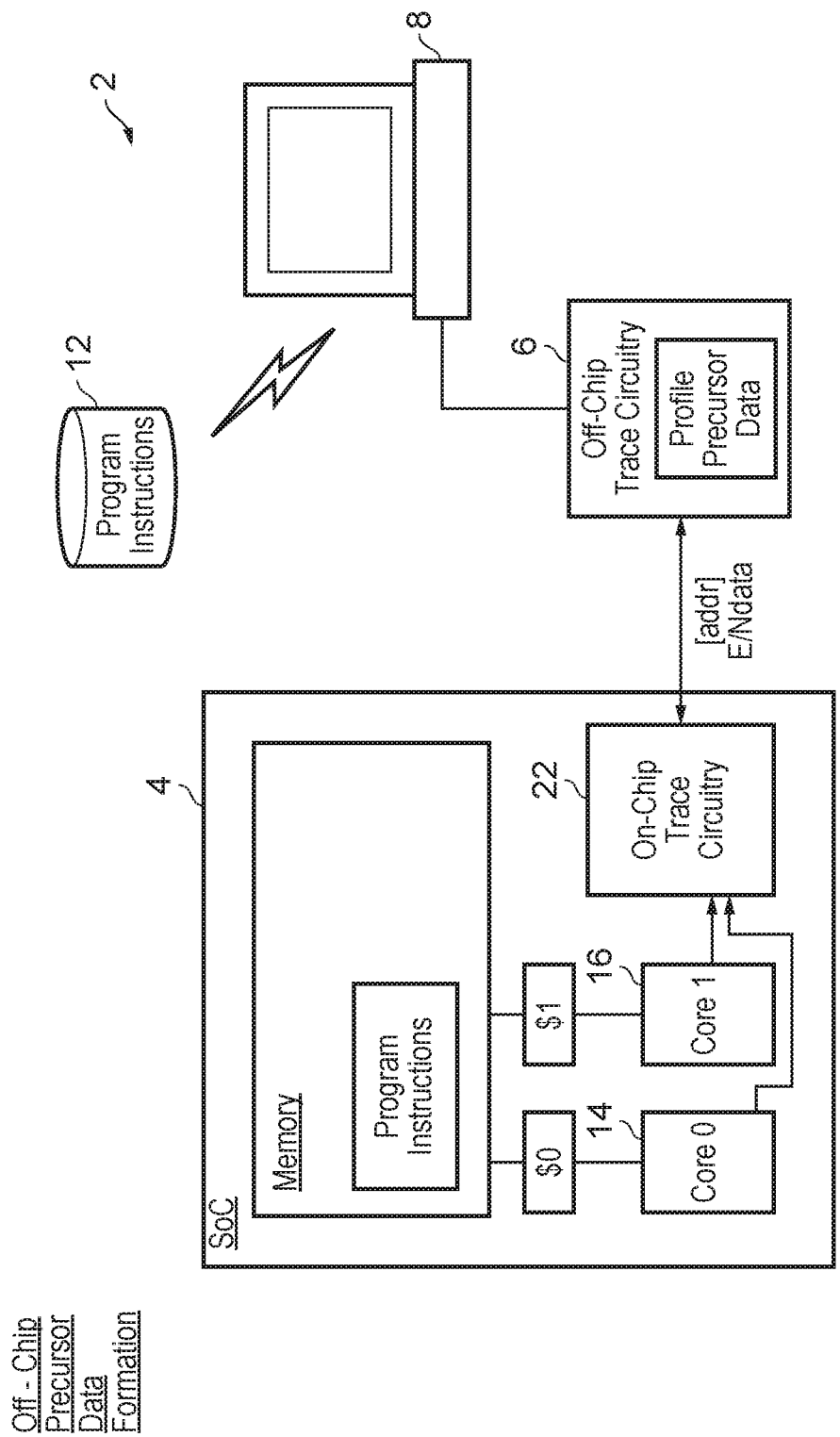
FIG. 2 schematically illustrates a data processing system using off-chip precursor data formation.

FIG. 1 illustrates an example embodiment in which the on-chip trace circuitry 22 forms the profile precursor data including the trace objects. FIG. 2 illustrates an example embodiment in which it is the off-chip trace circuitry 6 which serves to form the profile precursor data containing the trace objects. In the FIG. 2 example embodiment the on-chip trace circuitry 22 passes data indicating branch instruction outcomes (E/N data) for branch instructions executed by the processing circuitry (cores 14, 16) to the off-chip trace circuitry 6. The on-chip trace circuitry 22 further passes address data ([addr]) to the off-chip trace circuitry 6 indicating program addresses of non-static branch targets (e.g. data dependent branch targets) of branch instructions executed as well as program instruction addresses or program instructions serving as periodic synchronization points.

In this example embodiment of FIG. 2, the off-chip trace circuitry 6 forms the trace objects from the data sent to it by the on-chip trace circuitry 22. The profile precursor data formed by the off-chip trace circuitry is then sent to the general purpose computer 8 where it is analyzed in combination with the program instructions 12 to provide debug and diagnostic information (as well as other, information concerning the program instructions 12 and the operation of the integrated circuit 4).

The trace circuitry which forms the target objects may be special purpose hardware provided within the on-chip trace circuitry 22 or the off-chip trace circuitry 6. It may alternatively be more general purpose hardware, such as a dedicated small processor core, which serves to form the trace objects by executing its own program code (e.g. firmware which serves to generate the trace objects). It might also be possible in other example embodiments that the trace circuitry be provided by the processing circuitry of the general purpose computer 8 executing under program control to form the profile precursor data which is then sent elsewhere for analysis with the benefit that such a profile precursor data formed by the general purpose computer 8 has a more compact representation for sending elsewhere.

Figure 3:
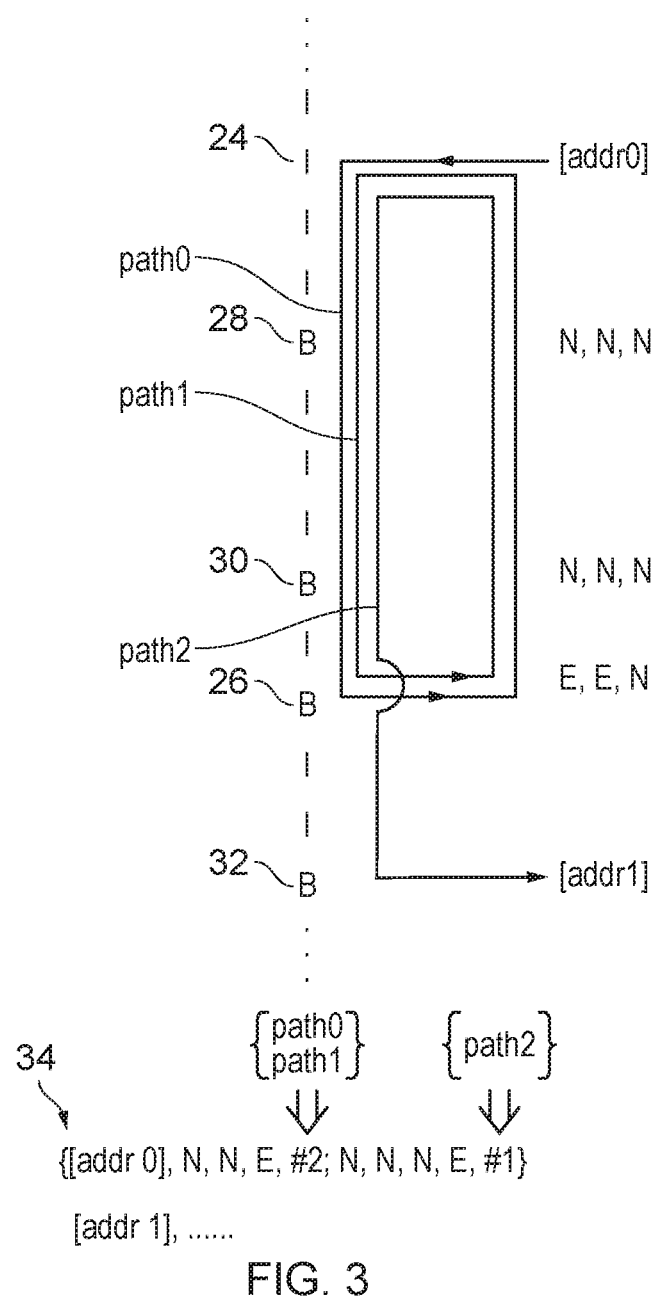
FIG. 3 schematically illustrates a sequence of executed program instructions and associated trace objects representing that sequence.

FIG. 3 schematically illustrates a sequence of program instructions including branch instructions B and instructions I which are not branch instructions and accordingly cannot form points at which the program flow changes. In the example shown, the sequence of program instructions is entered at addr0 corresponding to instruction 24. Program flow then passes from program instruction 24 to a conditional branch instruction 26 three times. When executing the sequence of program instructions following start address addr0 two further conditional branch instructions 28, 30 are passed and are not executed and then an executed (taken) branch instruction 26 is reached. Whether a branch instruction 26, 28, 30 is executed or not executed is indicated by an E or an N in FIG. 3.

The third time at which the branch instruction 26 is encountered it is not executed and accordingly a jump back to the start address addr0 of this instruction 24 is not made. Accordingly, the sequence of branch outcomes for the branch instruction 26 is executed, executed, not-executed (E, E, N). The branch instructions 28, 30 within the loop illustrated are each not executed on all three occasions and accordingly their branch outcomes are not-executed, not-executed, not-executed (N, N, N).

Following the non-execution of the branch instruction 26 on its third occurrence, program flow proceeds to branch instruction 32 which is executed (taken) and triggers a branch to a new starting address addr1.

FIG. 3 also schematically illustrates a trace object 34 corresponding to the sequence of execution paths shown in FIG. 3. In particular, the trace object 34 comprises a start address indicator [addr0] indicating the start address of the sequence corresponding to the instruction address of instruction 24. A branch outcome indicator indicating a sequence of branch outcomes corresponding to the branch instructions 28, 30 and 26 on the first two traverses of the sequence (path0, path1) is indicated by N, N, E, indicating not-executed, not-executed, executed. A count indicator #2 serves to indicate that this sequence of branch outcomes, i.e. N, N, E was detected as occurring twice. The trace object 34 further indicates another execution path which starts at the start address addr0, namely the one extending between instruction 24 and the branch instruction 32. The branch outcome indicator for this path is not-executed, not-executed, not-executed, executed corresponding to the outcomes for branch instructions 28, 30, 26 and 32 as followed along this path. This path is followed once as indicated by the count indicator #1. This execution path corresponds to path2.

Although not shown in the trace object 34, it is possible in some embodiments that the trace objects may serve to indicate a starting address of the next sequence of program instructions to be executed following a sequence of program instructions represented by the trace object concerned, e.g. the trace object 34 may additionally include a pointer to the starting address addr2 of the sequence of program instructions to be executed following the execution of the branch instruction 32.

The following pseudocode gives a programming representation of processing which may be performed upon received branch outcome specifying data and received address data in order to generate example trace objects. Such pseudocode may correspond to code executed as firmware by, for example, the on-chip trace circuitry 22 of FIG. 1 or the off-chip trace circuitry of FIG. 2. The comments within this pseudocode also make reference to a possible form of trace object using a leaf and branch representation of multiple execution paths within each trace object such as is illustrated in FIG. 4.

```
# Pseudocode for constructing a pre-decode profile.
# The input is a sequence of events:
# ADDR(address)     - a branch to a specific address
# BRANCH(E)         - the next branch was taken
# BRANCH(N)         - the next branch was not taken
Sequence = {
    start_addr: address
    branches: LIST OF (E or N)
```

```
    next_addr: address
}
# Start off with no trace objects
MAP (Sequence -> integer) objects = [ ]
# The sequence we're currently building
Sequence current_seq = None
# Process each event
for Event evt in trace:
    if evt is ADDR(addr):
        if current_seq:
            # This branch terminates the sequence we're working on
            current_seq.next_addr = addr
            if current_seq in objects:
                # there's already an object for this sequence
                objects[current_seq] += 1
            else:
                # new sequence, add it to objects with count 1
                objects[current_seq] = 1
        # Start a new sequence
        current_seq = {start_addr: addr, [ ], None}
    else if evt is E or N:
        current_seq.branches.append(evt)
# Wrap up by processing the last sequence
if current_seq in objects:
    objects[current_seq] += 1
else:
    objects[current_seq] = 1
# The 'objects' map now consists of a set of sequences, each of which is
# - a start address
# - a sequence of E/N indicators
# - a final address
# - a count
# Note that a given start address will in general map to several sequences.
# To later convert this data structure into a program profile,
# once the program images are available:
for Sequence s in objects:
    pc = s.start_addr
    for b in s.branches:
        inspect image to find address pc' of next branch
        add s.count to each instruction from pc to pc'
        if b == E:
            pc = target of b
            add s.count to count of banches from b to target of b
        else:
            pc = pc'
    add s.count to each instruction from pc to s.end_addr
# The data can be more compactly represented by merging common
prefixes,
# creating a new array with one entry per start address, and the sequences
# starting at that address represented as a branching data structure.
# This more compact structure could be built directly.

# To create a program profile from this compact data structure it could
either
# be decompressed into the original flat data structure, or processed
directly.
```

Figure 4:
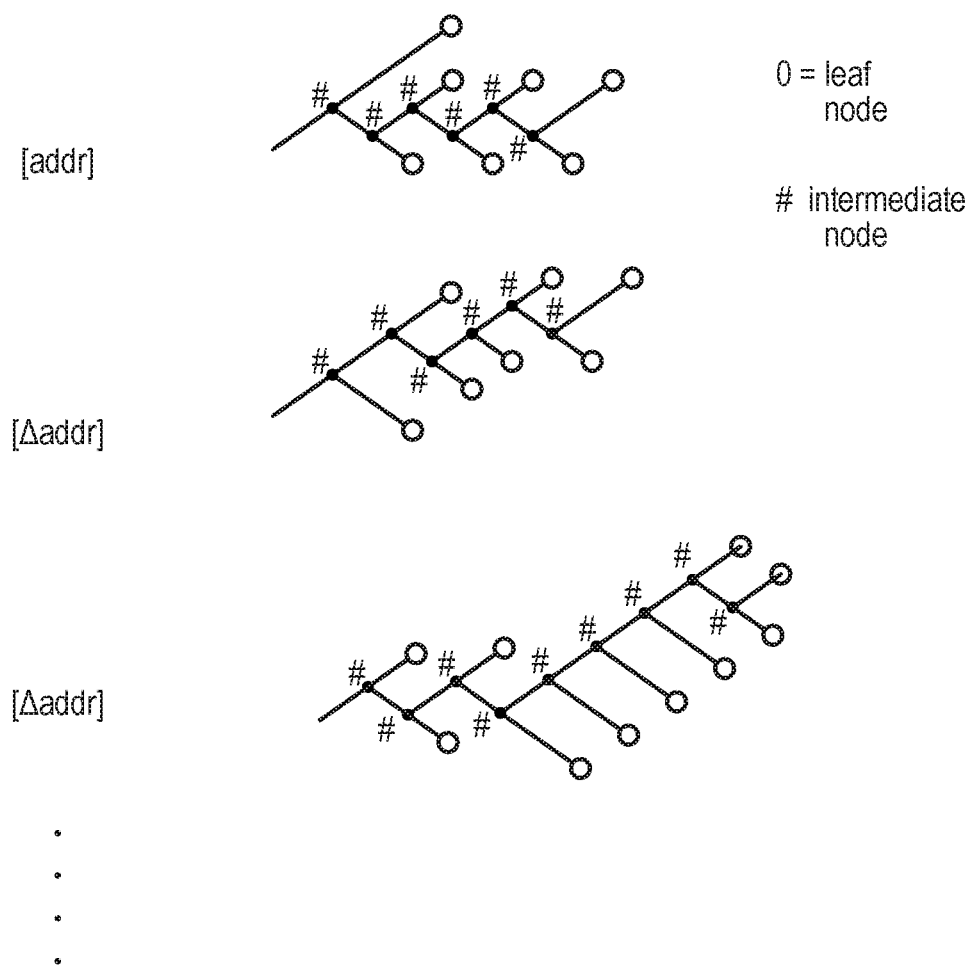
FIG. 4 schematically illustrates a further example of trace objects representing sequences of executed program instructions.

FIG. 4 shows a plurality of trace objects using a leaf and branch representation of multiple execution paths within each trace object. The first trace object specifies an absolute address [addr]. The following trace objects specifying their starting address by virtue of an offset value from the starting address of the first trace object, namely [Δaddr]. The individual trace objects represent execution paths which pass through branch instructions extending from the starting address and which correspond to either intermediate nodes or leaf nodes. A leaf node terminates an observed/detected sequence of branch outcomes and is indicated by "o" in the representation of FIG. 4. An intermediate node represents a branch outcome which does not terminate an observed execution path and is indicated by "#" in FIG. 4. A leaf node has a count indicator associated with it and optionally a next address indicator of a next address of a sequence of program instructions executed following the branch instruction corresponding to that leaf node. The number of times the branch instruction corresponding to an intermediate node was executed may be determined by summing the count values associated with each of the leaf nodes following that intermediate node within the branching paths represented.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data comprising:
processing circuitry to execute program instructions of a program; and
trace circuitry to generate a plurality of trace objects, wherein
a trace object represents a sequence of executed program instructions and when a sequence of executed program instructions includes multiple passes of a sequence of branch outcomes for which the sequence of branch outcomes is identical for each of the multiple passes, a single trace object represents the multiple passes as:
a start address indicator to indicate a start address of said sequence of executed program instructions;
a branch outcome indicator to indicate the sequence of branch outcomes within said sequence of executed program instructions starting from said start address; and
a count indicator included within said trace object to indicate a count of passes of said sequence of branch outcomes detected in the sequence of executed program instructions represented by the single trace object.

2. Apparatus as claimed in claim 1, wherein said trace object comprises a next address indicator to indicate a starting address of a next sequence of program instructions to be executed following said sequence of executed program instructions.

3. Apparatus as claimed in claim 2, wherein said trace circuitry collects together said trace objects to form profile precursor data, and said profile precursor data represents a count of pairs of branch instruction addresses with respective branch target addresses.

4. Apparatus as claimed in claim 3, wherein said profile precursor data comprises data representing said trace objects ordered by respective represented start addresses.

5. Apparatus as claimed in claim 4, wherein at least some of said start addresses of trace objects forming said profile precursor data are represented as address offsets from start addresses of other trace objects forming said profile precursor data.

6. Apparatus as claimed in claim 1, wherein said count indicator saturates at one and said trace objects provide coverage data indicative of whether or not program instructions have been executed.

7. Apparatus as claimed in claim 1, wherein said processing circuitry comprises a plurality of processors executing respective streams of program instructions and said trace circuitry is configured to generate said trace objects to represent separately said streams of program instructions.

8. Apparatus as claimed in claim 1, wherein processing circuitry is configured to provide said trace circuitry with data indicative of branch instruction outcomes for branch instructions executed by said processing circuitry and program instruction addresses of non-static branch targets of branch instructions executed by said processing circuitry.

9. Apparatus as claimed in claim 8, wherein said processing circuitry is configured to provide said trace circuitry with data indicative of program instruction addresses of program instructions executed by said processing circuitry as synchronization points.

10. Apparatus as claimed in claim 8, wherein said trace circuitry is configured to respond to program instruction address data received from said processing circuitry to terminate tracking a currently tracked sequence of program instructions and to start tracking a next tracked sequence of program instructions.

11. Apparatus as claimed in claim 1, wherein said trace circuitry collects together said trace objects to form profile precursor data, and said profile precursor data in combination with said program represents how many times given sequences of program instructions were executed by said processing circuitry.

12. Apparatus as claimed in claim 11, wherein said profile precursor data runlength encodes said sequences of branch outcomes.

13. Apparatus as claimed in claim 1 wherein said trace object specifies a plurality of branching execution paths corresponding to respective sequences of branch outcomes starting from a common start address passing through shared intermediate branching nodes and individually terminating in a leaf node.

14. Apparatus as claimed in claim 13, wherein each of said leaf nodes has an associated count indicator indicating a count of times a branching execution path terminating at said leaf node was executed by said processing circuitry.

15. Apparatus as claimed in claim 14, wherein a trace object comprising a given intermediate node represents a count of how many times a sequence of program instruction extending between said common start address and said given intermediate node was executed by a sum of count values associated with leaf nodes of executing paths that include said given intermediate node.

16. Apparatus as claimed in claim 13, wherein at least some of leaf nodes have an associated next address indicator indicating an address of a next program instruction executed by said processing circuitry following a branching execution path terminating at said leaf node.

17. Apparatus as claimed in claim 1, wherein said processing circuitry is a processor core of an integrated circuit and said trace circuitry is one of:
on-chip trace circuitry within said integrated circuit; and
off-chip trace circuitry coupled via a communication interface with said integrated circuit.

18. Trace circuitry for coupling to processing circuitry executing program instructions of a program to generate a plurality of trace objects, wherein
a trace object represents a sequence of executed program instructions and when a sequence of executed program instructions includes multiples passes of a sequence of branch outcomes for which the sequence of branch outcomes is identical for each of multiple passes, a single trace object represents the multiple passes as:
a start address indicator to indicate a start address of said sequence of executed program instructions;
a branch outcome indicator to indicate the sequence of branch outcomes within said sequence of executed program instructions starting from said start address; and
a count indicator included within said trace object to indicate a count of passes of said sequence of executed program instructions executed in the sequence of executed program instructions represented by the trace object.

19. A method of processing data comprising:
executing program instructions of a program; and
generating a plurality of trace objects, wherein
a trace object represents a sequence of executed program instructions and when a sequence of executed program instructions includes multiple passes of a sequence of branch outcomes for which the sequence of branch outcomes is identical for each of the multiple passes, a single trace object represents the multiple passes as:
a start address indicator to indicate a start address of said sequence of executed program instructions;
a branch outcome indicator to indicate the sequence of branch outcomes within said sequence of executed program instructions starting from said start address; and
a count indicator included within said trace object to indicate a count of passes of said sequence of executed program instructions executed in the sequence of executed program instructions represented by the trace object.

20. A method of analyzing execution of a program comprising:
receiving data specifying program instructions of said program;
receiving data specifying trace objects representing a sequence of executed program instructions and when a sequence of executed program instructions includes multiple passes of a sequence of branch outcomes for which the sequence of branch outcomes is identical for each of the multiple passes, a single trace object represents the multiple passes as:
a start address indicator to indicate a start address of said sequence of executed program instructions;
a branch outcome indicator to indicate the sequence of branch outcomes within said sequence of executed program instructions starting from said start address; and
a count indicator included within said trace object to indicate a count of passes of said sequence of executed program instructions executed in the sequence of executed program instructions represented by the trace object; and
analyzing said data specifying program instructions and said data specifying trace objects to determine at least how many times a given program instruction was executed.

21. A method as claimed in claim 20, wherein said analyzing determines in which execution paths said given program instruction is included.

* * * * *